(12) United States Patent
Gessner et al.

(10) Patent No.: US 8,013,111 B2
(45) Date of Patent: Sep. 6, 2011

(54) REMOVAL OF CATALYST AND/OR COCATALYST RESIDUES IN A POLYOLEFIN MANUFACTURING PROCESS

(75) Inventors: Mark A. Gessner, Houston, TX (US); Sean Michael Hockett, Pearland, TX (US)

(73) Assignee: INEOS USA LLC, Lisle, IL (US)

( * ) Notice: Subject to any disclaimer, the term of this patent is extended or adjusted under 35 U.S.C. 154(b) by 34 days.

(21) Appl. No.: 12/653,774

(22) Filed: Dec. 17, 2009

(65) Prior Publication Data

US 2011/0152476 A1 Jun. 23, 2011

(51) Int. Cl.
*C08F 6/00* (2006.01)
*C08F 2/14* (2006.01)

(52) U.S. Cl. .......................................... 528/486; 526/64
(58) Field of Classification Search ................... 528/486, 528/501; 526/64
See application file for complete search history.

(56) References Cited

U.S. PATENT DOCUMENTS

| 4,826,665 | A | * | 5/1989 | Fannin et al. | 423/210 |
| 6,586,537 | B2 | * | 7/2003 | Marissal et al. | 526/70 |

* cited by examiner

*Primary Examiner* — Fred M Teskin
(74) *Attorney, Agent, or Firm* — David P. Yusko; James J. Drake; Vik Panchal

(57) ABSTRACT

The invention relates to an improved process for the manufacture of an olefin polymer composition in which corrosive trace cocatalyst and catalyst residues are removed from the hydrocarbon gas recycle stream prior to compression and re-use in the polymerization zone(s).

10 Claims, 1 Drawing Sheet

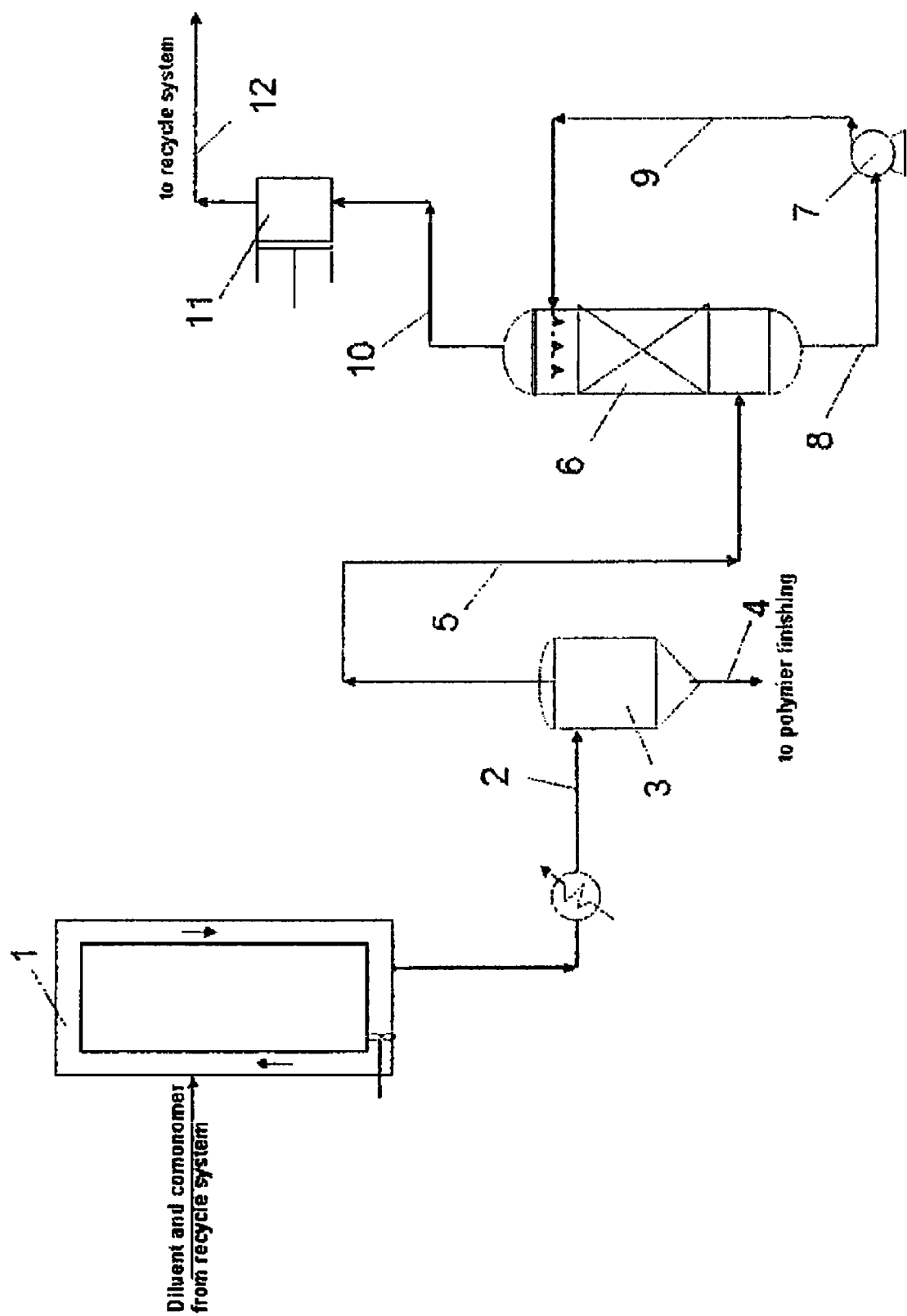

REMOVAL OF CATALYST AND/OR COCATALYST RESIDUES IN A POLYOLEFIN MANUFACTURING PROCESS

BACKGROUND OF THE INVENTION

1. Field of the Invention

The invention relates to an improved process for the manufacture of an olefin polymer composition where corrosive trace cocatalyst and/or catalyst residues are removed from the hydrocarbon gas recycle stream prior to compression and re-use in the polymerization zone(s).

2. Description of the Prior Art

The general use of one or more reaction zones to manufacture a polymer composition is described in prior art and further advanced by U.S. Pat. No. 6,586,537, the disclosure of which is incorporated herein by reference in its entirety.

In the typical prior art polymerization process, a Zeigler-Natta type catalyst and cocatalyst are often added to one or more reaction zones to produce an olefin polymer composition which is typically withdrawn from the final reaction zone and transferred to one or more flash vessels where the product polymer composition is separated from a hydrocarbon gas stream that is predominantly comprised of a diluent and unreacted monomers. This hydrocarbon gas stream will typically contain trace amounts of cocatalyst (e.g. aluminum alkyls) and catalyst that remain with the vapor phase. This stream is typically compressed downstream so that it may be treated further in a recycle section so as to recover the monomer(s) and diluent for re-use in the reaction zone(s).

Prior art processes with a Zeigler-Natta type catalyst and an alkyl cocatalyst, e.g. triethylaluminum (TEAL) typically suffer decreased reliability in the downstream rotating machinery as the residual co-catalyst and catalyst residues are known to aggressively deteriorate rotating machinery, particularly most compressor, packing materials.

While it is known that a mixture of a long-chain carboxylic acid and hydrocarbon inert scrubbing liquid can be used to remove residual alkyls from a gas stream (as disclosed in U.S. Pat. No. 4,826,665, the disclosure of which is incorporated herein by reference), there is no process disclosed in the prior art to remove trace alkyls or catalyst residues in a continuous manner from polymerization processes and the optimal carboxylic acid and oil mixture is not specified.

The present invention provides an optimized process which can be used for the manufacture of an olefin polymer composition that overcomes the drawbacks of the prior art.

BRIEF DESCRIPTION OF THE DRAWINGS

The drawing is a schematic showing the reaction zone, the letdown from the reactor to a low-pressure flash vessel, the alkyls and residual catalyst removal system, and the recycle gas compression system.

SUMMARY OF THE INVENTION

The present invention relates to an improved process for the manufacture of an olefin polymer composition where corrosive trace cocatalyst and/or catalyst residues are removed from a hydrocarbon gas recycle stream by scrubbing prior to recycle and re-use in the polymerization zone(s).

DETAILED DESCRIPTION OF PROCESS

According to the process of the invention, at least one olefin, e.g., ethylene, is continuously polymerized in a reactor/reaction zone in the presence of one or more monomers, inert hydrocarbons, catalyst(s), and co-catalyst(s) in order to produce solid particles of an olefin polymer, e.g., polyethylene. A gas phase or slurry phase process may be employed or a combination of such processes in series or parallel operation may be used. In a slurry embodiment, the olefin is further polymerized in the presence of a diluent (D), in order to produce a slurry or suspension (S) comprising the diluent (D) and solid particles of an olefin polymer, e.g., polyethylene.

A reaction effluent containing the polymer component together with a non-polymer component comprising a vapor or liquid phase reaction medium is then withdrawn from the polymerization reactor using any known technique and using one or more withdrawal lines. Where a slurry process is used, it is possible that the withdrawal is taken from a location in the loop where the reaction slurry is most concentrated and upstream of monomer and catalyst feeds. The non-polymer component contains one or more catalysts and/or aluminum alkyl cocatalysts.

The process comprises the step of scrubbing at least part of the non-polymer component with an oleic acid and light-oil mixture in order to reduce the concentration of catalysts and/or aluminum alkyl cocatalysts and produce a purified stream having a relative reduction of concentration of catalysts and/or aluminum alkyl cocatalysts, wherein the olefin polymerization reactor produces more than 16,000 pounds of polymerized olefin per hour. In some embodiments, the purified stream contains less than 0.5 parts per million of catalysts and less than 0.5 parts per million of cocatalysts.

In an optional embodiment, the reaction effluent is heated using an in-line slurry heater. Where multiple withdrawal lines are employed, each withdrawal line may be provided with a dedicated slurry heater. According to an embodiment utilizing the slurry process, the outlet temperature of each of the parallel heaters can be independently controlled, generally to be greater than 8 degrees F., preferably greater than 18 degrees F., above the dew point for sufficient time that the suspending diluent is essentially vaporized.

The withdrawn effluent stream(s) are let down to one or more separation vessel(s), operating at a lower pressure than the reactor, in order to separate reaction vapors from the polymer solids. Optionally, each withdrawal line may be provided with an independent parallel separation vessel.

In one embodiment, the primary separation vessel is maintained at a pressure of from about one (1) to less than 20 pound-force per square inch gauge (psig), and a degassed polymer is removed directly from this vessel. This separation vessel may also incorporate fresh or recycle gas purging facilities.

In an alternative embodiment, the main separation may be at a pressure such that the overhead vapor may be condensed against available cooling water (wherein the cooling water is maintained at a temperature between about 10° C. and about 40° C.) and the condensed vapor pumped back to the reaction system. The product withdrawn from a high or medium pressure primary separator is then letdown continuously or intermittently to a low pressure separator operating at <20 psig from where the final product polymer is removed. Alternatively, the product may be letdown to a purge column operating at between 5 and 30 psig, preferably less than 20 psig. The pressure will vary from system to system and will always be such as to ensure reliable powder flow while minimizing vapor leakage. Any or all of these separation vessels may also incorporate fresh or recycled gas purging facilities.

According to the process of the invention, hydrocarbons separated from the powder in the above vessel(s), containing inert hydrocarbons, monomer(s), comonomer(s), and other reaction components, are transferred to a scrubbing column, including of one or more stages. A mixture of oleic acid and light oil comes into contact with the hydrocarbon vapors in the scrubbing column. Trace aluminum alkyls and/or catalyst residues are collected in the oil, and the purified hydrocarbon vapor stream is removed out of the top of the scrubbing column before being recycled back to the reaction system.

In a possible embodiment the vapor stream exiting the low pressure separator is transferred to the scrubbing column and the purified gas stream from the top of the scrubbing column is compressed to at least 150 psig, and sent on for further treatment and purification and re-use in at least one reaction zone.

In another possible embodiment of the process, the recycled gas vapors are sent from the flash vessel(s) to the bottom of the scrubbing column where they rise up the column and contact the falling oleic-acid/light oil mixture in a section of one or more stages. The column includes a mass-transfer section that may be filled with loose packing material, but optionally structured packing or even trays may be used. If packed, the height of the packed section is designed to allow at least one stage of, and preferably two or more stages of mass-transfer contact between the oil mixture and the recycle gas. Most preferably, the process will comprise from about two stages to about five stages.

Preferably, the oil used in the scrubbing column is a mixture of a light oil and preferably from between 0 to about 30% by weight of oleic acid, more preferably from between 5 to about 30% by weight of oleic acid. The light oil is preferably a mineral or vegetable oil having a viscosity of between 1 to about 13 centipoise (cP), a specific gravity of between 700 to about 1000 kg/m3, and a flash point of >175° F. Any mixture of oils that achieve the above properties can be used as the light oil. The oleic acid/oil mixture is pumped through the column preferably at a sufficient flowrate to achieve a mass flow ratio of circulating oil to recycle gas of >1.0.

According to the process of the invention, the oil mixture recirculates from the column bottom (liquid-sealed from the recycle gas by an oil level at the column bottom) via a pump, optionally through a downstream filter, and reenters the column through an entry pipe that introduces the oil over a liquid distributor plate just above the packed section. The ratio of the mass flow rate of the circulating light oil/oleic acid mixture to the mass flow rate of the recycle gases is greater than 1.0. The column is preferably of sufficient diameter to allow for a vapor velocity of between 0.4 and 6 ft/s, and more preferably between 1.0 and 4.0 ft/s.

In a possible embodiment of the invention, a demister pad is employed above the oil-entry level to keep the oleic acid/oil inside the scrubbing column by avoiding oil entrainment in the vapor stream. Above the demister pad it is also possible to employ a bed of solid caustic pellets designed to neutralize small amounts of HCL that may form in the vapor stream by reaction of catalyst residues with the oleic acid.

The oil in the scrubbing column is periodically removed and replaced with fresh oil. Samples of the oil are periodically removed and analyzed for aluminum and/or chloride content, preferably at least once per week of continuous operation.

From the top of the alkyls scrubbing column, the cocatalyst and catalyst residue-free recycle gas stream is transferred to one or more gas compressor(s), where it is compressed to a pressure of at least 150 psig and sent to a recycle system for further treatment and purification. At least part of the recovered diluent and comonomer hydrocarbons are then re-introduced in at least one reaction zone.

The term "olefin polymers" as used herein includes both the homopolymers of an olefin and the copolymers of an olefin, with one or more other olefins (or monomers) able to be copolymerized with the olefin. Possible olefins include ethylene, propylene, butene, pentene, hexane and octene.

The process according to the invention is applicable to the production of an olefin polymer, and more especially to the production of an ethylene polymer composition in one or more reactors. When using more than one reactor it is possible to operate the reactors in series. Such a configuration is very suitable for obtaining an ethylene polymer composition comprising a polymer (A) and a polymer (B) having a different comonomer content and a different molecular mass (i.e. "bimodal" grades), but also suitable for grades that have nearly identical comonomer content and molecular mass in all polymerization zones (i.e. "monomodal" grades).

When a slurry process is used the diluent may be any diluent (inert or reactive) that is liquid under the polymerization conditions and in which most of the polymer formed is insoluble under those conditions. The diluent is preferably an acyclic aliphatic hydrocarbon containing from 3 to 8 carbon atoms, and in particular may be selected from the group consisting of isobutane, pentane, hexane, propylene and propane are particularly possible diluents for use in the process of the invention.

In the polymerization step, any catalyst allowing olefins to polymerize may be used. These may include catalysts of the Zeigler type, catalysts based on chromium or vanadium, metallocene catalysts, as well as those catalysts based on late transition metals. The productivity of the catalyst may be between 2000 grams of olefin polymer per gram of catalyst (g/g) to greater than 30,000 g/g. In Ziegler catalyzed reactions the productivity is typically between 5000 and 40000 g/g, preferably greater than 15,000 g/g.

The co-catalyst may be selected from aluminum alkyls such as triethylaluminum or TEAL, triisobutylaluminum or TIBAL, ethylaluminum dichloride or EADC, and diethylaluminum chloride or DEAC. For Ziegler catalyzed reactions where TEAL is used, the concentration of the alkyl in the reactor is typically between 70 to 90 ppm Alkyl by weight, which corresponds to between 150 to 200 ppm molar of TEAL.

The process according to the invention allows the polymerization process to run more reliably for longer periods without failure, particularly at high production rates. In particular, the polymerization process according to the invention is designed to preferably run at greater than 16 kilopounds per hour (kpph), most preferably greater than 20 kpph.

Example 1

Production of a monomodal-grade copolymer was carried out using the process described in the invention and the plant described in the drawing.

A slurry-loop reactor 1 was continuously fed with ethylene, hexene, and hydrogen. A stream of isobutane diluent and hexene recovered from a recycle section was also added directly to the reactor 1. A Zeigler-type catalyst and an aluminum alkyls co-catalyst (tri-ethyl aluminum or TEAL) was also added to reactor 1. The pressure and temperature conditions in reactor 1 were 185° F. and 490 psig, respectively. The hexene concentration in the reactor 1 was approximately 5.8% by weight. Some of the suspension of particles of the polymer composition was continuously drawn off from the reactor 1 via a control valve and the line 2. The total flow rate of withdrawn suspension was 44 kpph, and this suspension comprised about 45% by weight of particles of a copolymer. The withdrawn suspension was sent to a slurry heaters where it is heated up to 145 F prior to entering the flash vessel 3 where the polymer particles are separated out. The pressure of the flash vessels 3 was 7 psig. The total rate of the polymer composition stream leaving the flash vessels via lines 4 was 20 kpph. The combined overhead gases composed essentially of isobutane diluent, hexene, and ethylene were sent on via line 5 to the alkyls scrubbing column 6. The flowrate of this stream is 24 kpph. The flow rate of the oil withdrawn from the bottom of the column via line 8 to pump 7 and back to the top of the column via line 9 was 150 gpm or 68 kpph. The overhead gases with alkyls- and catalyst-residues removed were transferred via line 10 through compressors 11 where the stream was compressed to about 200 psig, then transferred via line 12 to the recycle section, where most of the isobutane and hexene were separated out and returned to the reactor 1. Based on the total cocatalyst (TEAL) feed rate minus the amount in the product flake as measured by aluminum content, the total quantity of alkyls (TEAL) in the vapor stream feeding column 6 was 0.013 pph (or 0.003 pph of Al). Based on Al measurement of oil samples from column 6 the total quantity of TEAL removed was 0.0123 pph (or 0.00283 pph of Al). This left 0.0007 pph in the outlet vapor stream entering the compressor 11. In concentration terms, the TEAL content of the vapor stream dropped from 0.54 wgt ppm to 0.029 wgt ppm. Based on similar measurement for the catalyst, the total catalyst in the vapor stream feeding column 6 was 0.014 pph. The total catalyst removed was 0.0134 pph, leaving 0.0006 pph in the vapor stream at the outlet of column 6 via line 10 entering the compressor 11. In concentration terms, the catalyst content of this vapor stream dropped from 0.58 wgt. ppm to 0.025 wgt. ppm.

Reliability data was collected during long-term production of various products that used TEAL and a Zeigler type catalyst with the scrubber column 6 in service. The compressor 11, which was a reciprocating type compressor in this example, did not fail due to packing material or rider band problems during 10 months of Example 2

For comparison to the prior art process, production of a monomodal-grade polymer was again carried out repeating the process described in Example 1, except that the scrubber column 6 was completely bypassed. For this example, not according to the invention, the combined overhead gases composed essentially of isobutane diluent, hexene, and ethylene along with the trace TEAL and catalyst residues were sent directly from the flash vessel (s) 3 to the compressor 11. The TEAL and catalyst in the overhead gas stream entering the compressor was 0.013 pph and 0.014 pph, respectively. In concentration terms, the TEAL and catalyst content of this stream was 0.54 wgt ppm and 0.58 wgt ppm, respectively.

Reliability data was collected during long-term production of various products that used TEAL and a Zeigler type catalyst prior to installation of the scrubber column or with the scrubber column 6 being bypassed. The mean time between failures (due to packing material or rider band problems) for the reciprocating compressor 11 was 4 months.

Comparing examples 1 and 2, it is shown that the use of the scrubber column, in the process according to the invention, resulted in a drop of TEAL concentration in the recycle gas stream from 0.54 wgt ppm to 0.029 wgt ppm, and a drop in catalyst concentration in the recycle gas from 0.58 wgt ppm to 0.025 wgt ppm. For the manufacture of polymer products made with Zeigler-type catalyst and aluminum alkyl (i.e. TEAL) co-catalyst, this reduction in corrosive residues resulted in a nearly three-fold increase (2.5 times the uninterrupted run time) in the reliability of the recycle gas compressor with a corresponding fixed cost reduction.

What is claimed is:

1. A process for treating an effluent stream from an olefin polymerization reactor, said effluent stream comprising a polymer component and a non-polymer component, the non-polymer component containing one or more catalysts and/or aluminum alkyl cocatalysts, the process comprising the step of scrubbing at least part of the non-polymer component with an oleic acid and light-oil mixture in order to reduce the concentration of catalysts and/or aluminum alkyl cocatalysts and produce a purified stream, wherein the olefin polymerization reactor produces more than 16,000 pounds of polymerized olefin per hour.

2. A process according to claim 1 wherein the step of scrubbing is performed at a pressure ranging from 1 to 20 psig.

3. A process according to claim 1 wherein the purified stream contains less than 0.5 parts per million of catalysts and less than 0.5 parts per million of cocatalysts.

4. A process according to claim 1 wherein the concentration of catalyst in the non-polymer component in the scrubbing step is greater than 0.55 parts per million and the concentration of cocatalyst is greater than 0.53 parts per million.

5. A process according to claim 1 wherein the purified stream is compressed to greater than 150 psig.

6. A process according to claim 3 further comprising the step of recycling the purified stream to one or more polymerization reactors.

7. A process according to claim 6 further comprising the step of compressing the purified stream in a compressor before the step of recycling, wherein the temperature within the compressor is between 100 and 250 degrees Fahrenheit.

8. A process according to claim 1 wherein the catalyst is a Ziegler catalyst and the cocatalyst is a triethylaluminuin compound.

9. A process according to claim 1, wherein the step of scrubbing is carried out in a scrubbing column having one or more stages and wherein the mixture of light oil and oleic acid is circulated through the stages of the column.

10. A process according to claim 1, wherein the light oil is a mixture of oils having a viscosity ranging from 1 to 13 centipoise and a flash point of greater than 175° F.

* * * * *